(12) United States Patent
Meylan

(10) Patent No.: US 8,509,111 B2
(45) Date of Patent: Aug. 13, 2013

(54) ROBUST HEADER COMPRESSION/DECOMPRESSION METHODS AND SYSTEMS

(75) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/460,585

(22) Filed: Apr. 30, 2012

(65) Prior Publication Data

US 2012/0213180 A1 Aug. 23, 2012

Related U.S. Application Data

(62) Division of application No. 12/237,008, filed on Sep. 24, 2008, now Pat. No. 8,199,663.

(60) Provisional application No. 61/019,827, filed on Jan. 8, 2008, provisional application No. 60/976,390, filed on Sep. 28, 2007.

(51) Int. Cl.
*H04L 12/26* (2006.01)
*H04L 12/28* (2006.01)

(52) U.S. Cl.
USPC .......................................... 370/252; 370/392

(58) Field of Classification Search
None
See application file for complete search history.

(56) References Cited

U.S. PATENT DOCUMENTS

| | | | |
|---|---|---|---|
| 5,729,535 A * | 3/1998 | Rostoker et al. | 370/328 |
| 8,199,663 B2 | 6/2012 | Meylan | |
| 2004/0185860 A1 * | 9/2004 | Marjelund et al. | 455/450 |
| 2006/0013235 A1 | 1/2006 | Farnham | |
| 2006/0268865 A1 | 11/2006 | Yokota | |
| 2007/0211724 A1 * | 9/2007 | Johansson et al. | 370/392 |

FOREIGN PATENT DOCUMENTS

| | | |
|---|---|---|
| EP | 0783232 A2 | 7/1997 |
| WO | 03096647 A1 | 11/2003 |
| WO | 2007102780 A2 | 9/2007 |

OTHER PUBLICATIONS

3GPP, ETSI: Universal Mobile Telecommunications system (UMTS); Radio Resource Control (RRC); Protocol specification (3GPP TS 25.331 version 7.2.0 Release 7). ETSI TS 125 331 V.7.2.0, Sep. 2006, XP002423759.
3rd Generation Partnership Project; Technical Specification Group Radio Access Network; Evolved Universal Terrestrial Radio Access (E-UTRA) Packet Data Convergence Protocol (PDCP) specification (Release 8), 3GPP TS 36.323 V1.0.0, Sep. 2007.
International Search Report and the Written Opinion—PCT/US2008/077886 International Search Authority—European Patent Office—Apr. 20, 2009.
Madsen T.K., et al., "Zero—AIC Header Compression with Multiple Description Coding for 4G Wireless Networks" Internet Article, [Online] 2005, XP002520442 Retrieved from the Internet: URL:http://citeseerx.ist.psu.edu/viewdoc/download"doi=10.1.1.59.5390&rep=repl&type=pdf> [retrieved on Mar. 20, 2009] the whole document.

(Continued)

*Primary Examiner* — Clemence Han
(74) *Attorney, Agent, or Firm* — Liem T. Do

(57) ABSTRACT

A method for a wireless communication system is provided. The method includes receiving a maximum compression rate or a maximum decompression rate of a first device and reserving a rate of a medium communicatively linking the first device and a second device based on the maximum compression rate or the maximum decompression rate. The method also includes communicating between the first device and the second device based on the reserved rate of the medium.

20 Claims, 11 Drawing Sheets

(56) References Cited

OTHER PUBLICATIONS

Minaburo A et al: "Configuration and analysis of robust header compression in UMTS" 14th IEEE 2003 International Symposium on Personal, Indoor and Mobile Radio Communications. Proceedings (IEEE Cat. N0.03TH8677) IEEE Piscataway, NJ, USA, vol. 3, 2003, pp. 2402-2406, XP002520434, ISBN: 0-7803-7822-9 the whole document.

Svanbro K et al: "Wireless real-time IP services enabled by header compression" VTC2000—Spring. 2000 IEEE 51st Vehicular Technology Conference Proceedings (Cat. N0.00CH37026) IEEE Piscataway, NJ, USA, vol. 2, 2000, pp. 1150-1154 v o l ., XP002520435 ISBN: 0-7803-5718-3 the whole document.

Taiwan Search Report—TW097137358—TIPO—Mar. 19, 2012.

Taylor D E et al: "Robust header compression (ROHC) in next-generation network processors" IEEE/ACM Transactions on Networking IEEE; ACM USA, vol. 13, No. 4, Aug. 2005, pp. 755-768, XP002520433 ISSN-1063-6692 the whole document.

* cited by examiner

ROBUST HEADER COMPRESSION/DECOMPRESSION METHODS AND SYSTEMS

CROSS REFERENCE TO RELATED APPLICATIONS

The present Application for Patent is a Divisonal of U.S. patent application Ser. No. 12/237,008, filed Sep. 24, 2008, entitled "ROBUST HEADER COMPRESSION/DECOMPRESSION METHOD AND SYSTEMS", pending, which claims the benefit of United States Provisional Patent Application No. 60/976,390, entitled "ROHC METHODS AND SYSTEMS", filed on Sep. 28, 2007, and U.S. Provisional Patent Application No. 61/019,827, entitled "ROBUST HEADER COMPRESSION METHODS AND SYSTEMS", filed on Jan. 8, 2008, all of which are assigned to the assignee hereof and hereby expressly incorporated by reference in their entirety.

BACKGROUND

I. Field

The following description relates generally to wireless communications systems, and more particularly to header compression systems and methods for wireless communication systems.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

One portion of the data stream that is transmitted on various wireless networks relates to Internet Protocol (IP) headers. Due to the length of such headers, it is desirable to compress the headers to improve the efficiency of the network. Header compression (HC) is a method to compress IP packet headers. Several protocols exist to perform header compression, one example of which is the Robust Header Compression (RoHC) as specified in the IETF RFC 4095. For RoHC various profiles are specified including IP profiles which compress IP headers, including, but not limited to a User Datagram Protocol (UDP) profile for UDP/IP headers, a Real time Transport Protocol (RTP) profile for RTP/UDP/IP headers, and a Transmission Control Protocol (TCP) profile for TCP/IP headers. [Please add (ESP) profile for ESP/IP header compression to the list of RoHC profiles, where ever necessary].

Due to the extent of parsing, context lookup, storage, read/write operations required and so forth, the process of compressing and decompressing headers is computationally intensive. Also, due to the variety of operations involved, Header Compression (HC) is very often implemented in software rather than in hardware. While a terminal or other User Equipment (UE) may support 50 mega bits per second (Mbps) over the air on the downlink as well as an IP/Multimedia Subsystem (IMS) that includes RoHC IP, UDP, and RTP profiles, it is not reasonable to expect the UE to process 50 Mbps of header compressed data. Forcing the UE to support HC at bitrates advertised in the UE downlink/uplink (DL/UL) capability specification would cause such devices to be cost prohibitive. If more data is transmitted than the UE can decompress, the bandwidth spent transmitting the excessive data is diminished, since while such data are received at Layer 1 and acknowledged by Radio Link Control (RLC), HC cannot process the decompression rate and packets may be dropped within the terminal as buffers overflow. Worse yet, if many consecutive packets overflow before they are processed by the decompressor, the HC may become out of synchronization altogether.

When the HC is configured on the uplink (UL), similar reasons the UE may not be able to provide compressed at the rate advertised in the UE capability specification for. If the Evolved Node B (eNB) allocates UL resources up to the UE capability, these resources may not be properly utilized if the UE cannot compress fast enough. Digital padding may be used in order to fill the allocated transport block. One solution would be to disallow HC for flows with bit rates higher than a fixed threshold. However this would prevent future generations of UE from taking advantage of HC beyond the fixed threshold and also prevent potential, very efficient, HC implementations from utilizing the feature at high rates.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to specify user equipment capabilities to enable more efficient allocation of network bandwidth and dynamically adjust header compression/decompression rates according to available equipment resources. Network packets that can include header information in some applications are transmitted in conjunction with application data such as audio or video data. The network packets typically are transmitted as compressed headers in addition to the application data. Before data is transmitted and received across a wireless network, user equipment such as cell phones or other devices report respective network processing capabilities in the form of network parameters. Such parameters can include the number of bits per second that can be processed (e.g., compressed and decompressed), the number of headers per second, or other indication of processing capability at the equipment.

After the parameters have been reported, a base station or other transmitting component dynamically adjusts the rate at which compressed data is transmitted in order to accommodate the respective receiving device. In this manner, network bandwidth is utilization is maximized since data that may have been lost due to underperforming equipment is now transmitted at the rate supported by the equipment. Also, by adjusting network performance, overloading of the user equipment can be mitigated. In some applications, network parameters can be reported in an open-ended manner where the parameters are transmitted by the receiving equipment and utilized by the transmitting equipment to adjust network performance. In broader network applications, negotiations can occur between sender and receiver, where the negotiations determine an agreed upon protocol between network components.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
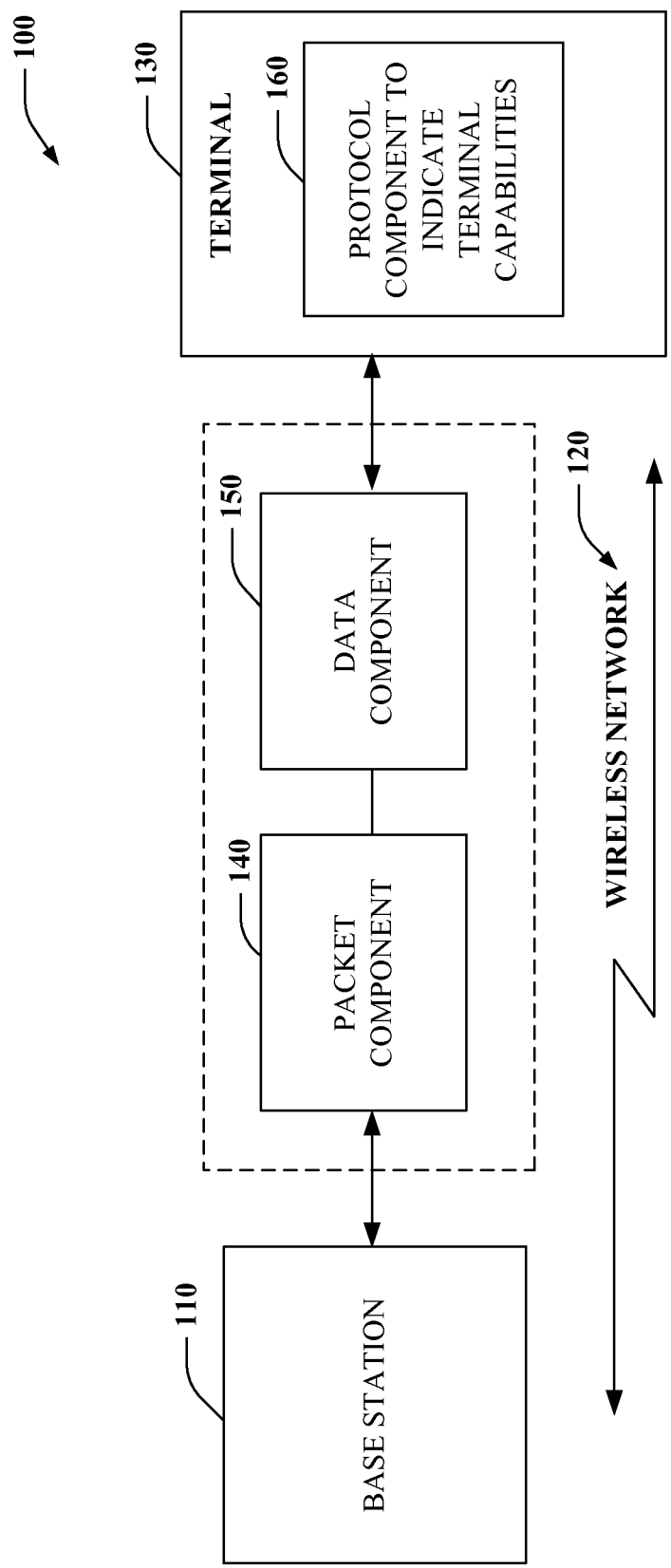
FIG. 1 is a high level block diagram of a system that adjusts network performance in view of user equipment capability.

Systems and methods are provided to dynamically adjust network performance in accordance with receiver capabilities in order to conserve bandwidth and improve receiver performance. In an aspect, a method for a wireless communication system is provided. The method includes communicating a packet of network profile information, where the packet is communicated across a network in association with application data such as Voice-Over Internet Protocol (VOIP), for example. The method also includes automatically reporting capability parameters of a terminal in order to process the network profile information, where the capability parameters are employed to adjust performance of the network. In another aspect, a method for communicating in a wireless communication system between a user equipment (UE) terminal and a Node B is provided. The method includes receiving a maximum compression rate of the UE or receiving a maximum decompression rate of the UE. The method also includes reserving a rate of a first medium communicatively linking the UE and the Node B based on at least one of the provided maximum compression rate and the provided maximum decompression rate and communicating between the UE and Node-B based on the reserved rate.

Furthermore, various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Referring now to FIG. 1, a system 100 illustrates dynamic network adjustments in view of user equipment capability. The system 100 includes a first device which can be a base station (or base stations) or other entity capable of communication over a network or a wireless network 120 to a second device which can be one or more access terminals 130 (also referred to as terminal, user equipment, or mobile device). Network packets 140 are transmitted in conjunction with application data 150, where the network packets are typically represented as compressed headers that are employed to facilitate communications of the application data 150. Before such packets 140 and data are transmitted however, the terminal 130 employs a protocol component 160 that communicates network performance parameters across the network 120 to the transmitter or base station 110. The network parameters indicate performance or processing abilities of the terminal. When received, the parameters are employed by the base station 110 to dynamically adjust network performance in accordance with the terminal 130.

In general, current standards call for header compression mandatory for IP/Multimedia Subsystem (IMS) capable user equipment (UEs) and optional for other UEs. Compression and decompression of headers is computationally intensive and therefore actual robust header compression (HC) capability may depend on the rate of the headers to compress or decompress. The protocol component 160 provides UE or terminal 130 capabilities to indicate maximum header compression and decompression rate supported by the terminal. With such information, the network 120 can configure header compression per bearer (component receiving a set of network data) when appropriate and avoid overloading the terminal 130 or improperly utilizing air resources when header compression is not suitable.

The system 100 enables more efficient allocation of network bandwidth and dynamically adjusts header compression/decompression rates according to available equipment resources. Network packets 140 that can include header information in some applications are transmitted in conjunction with application data 150 such as audio or video data. The network packets 140 typically are transmitted as compressed headers in addition to the application data 150. Before data is transmitted and received across the network 120, user equipment such as cell phones or other devices report respective network processing capabilities in the form of network parameters via the protocol component 160. Such parameters can include the number of bits per second that can be processed, the number of headers per second, the number of bits of header per second and/or other indication of processing capability at the equipment. Further the capability may be separated into compression and decompression rate. Further the capability may be advertised for each compression profile, for instance the IP or the UDP or the TCP or the RTP profile.

After the parameters have been reported by the terminal 130, the base station 110 or other transmitting component dynamically adjusts the rate at which compressed data is transmitted in order to accommodate the respective receiving device. In this manner, network bandwidth is conserved since data that may have been lost due to underperforming equipment is now transmitted at the rate supported by the equipment. Also, by adjusting network performance, overloading of the user equipment can be mitigated. In some applications, network parameters can be reported in an open-ended manner where the parameters are transmitted by the receiving equipment and utilized by the transmitting equipment to adjust network performance. In broader network applications, negotiations can occur between sender and receiver, where the negotiations determine an agreed upon protocol between network components.

The protocol component 160 adds to the terminal 130 or UE capabilities to indicate the maximal rate of headers a respective compressor and/or de-compressor can process. With such performance indication available, the base station or evolved node B (eNB) or other device can determine if robust header compression (HC) should be employed for a given flow. Considering that a smaller amount of direct benefits to the terminal or UE compared to the potential risk of being configured with header (de)compression on a high rate stream, the UE has small incentive to advertise HC capability when not mandated. Instead, if the terminal 130 can indicate at which rate it can comfortably handle the optional HC, it enables more equipment to support HC while maintaining reasonable cost and thereby increasing cell throughput. The following describe three example implementations although it is to be appreciated that other designs are possible.

In one aspect, UE capability is enhanced to indicate the maximal rate handled by the HC compressor and/or de-compressor of the terminal 130. The processing requirements for (de)compression typically scale with the numbers of IP headers to process, therefore a first choice as unit when specifying HC rate capability is the number of IP headers per second. Also the processing scales with the actual size of header to process, therefore the unit can be further refined to indicated number of bits of header per second that can be compressed and decompressed. However in practice it can be difficult for the equipment to determine the expected corresponding number of headers per second or header bitrate at the time of flow admission since no statistics are available about that flow. In order to mitigate adding complexity, the protocol component 160 can also use the (total) bit-rate of the flow as an approximation of the number of headers per second. In another aspect, the terminal can specify maximal HC compression and decompression rates with respect to the rate of the headers per second. In the below, rate may refers to any one of the metrics presented above. Thus, HC may be configured on more than one bearer, in which case the HC (de)compression rate is the sum of the rates of bearers where HC is configured. In yet another aspect, the eNB can configure HC to ensure the sum of the maximum rate of the bearers configured with HC for a given terminal 130 is less than the decompression rate on the downlink and the compression rate on the uplink. As can be appreciated, other protocols are possible.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
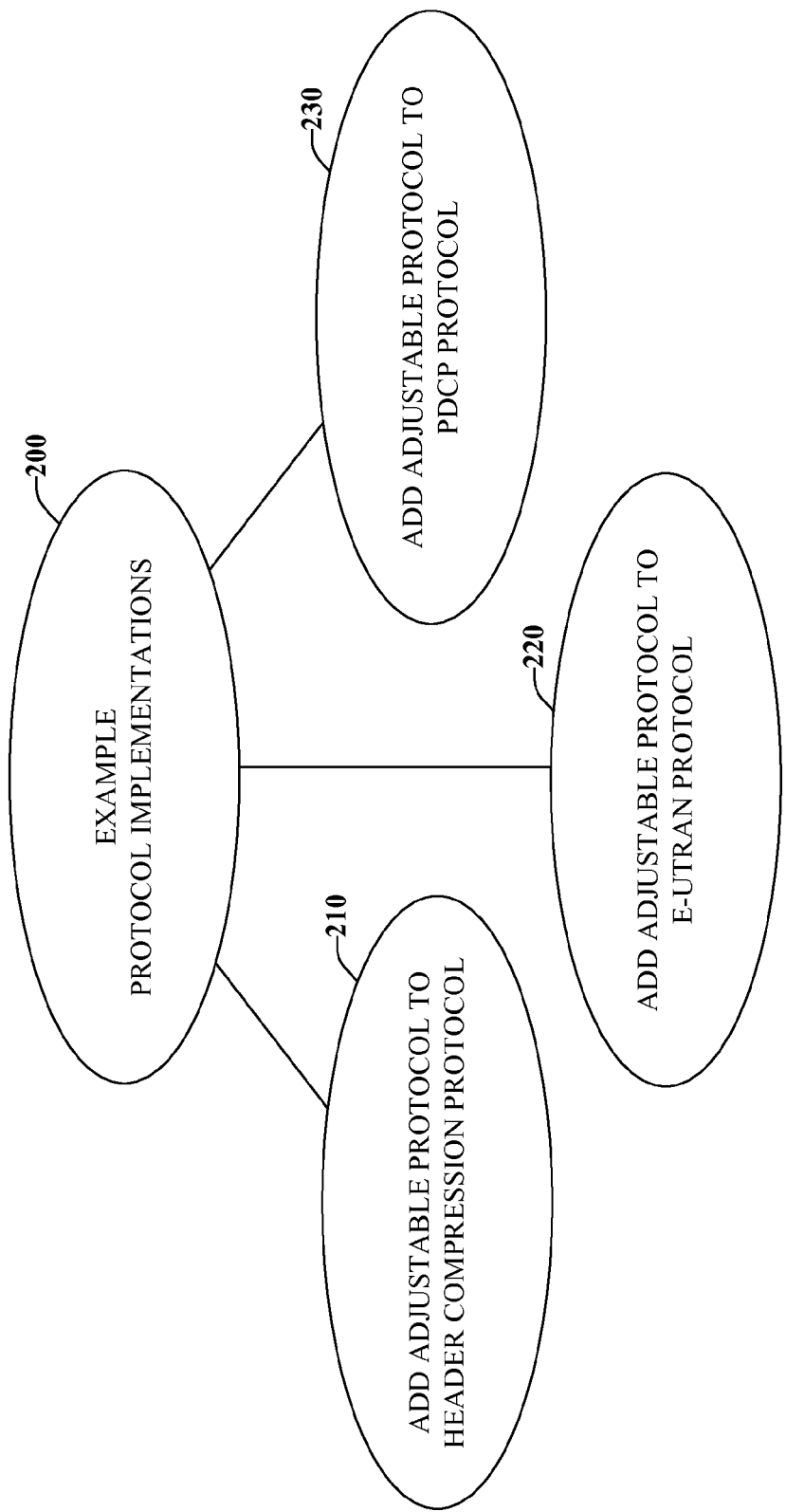
FIG. 2 is a block diagram of an example wireless communications methods for providing an adjustable network protocol.

Turning to FIG. 2, example protocol implementations 200 are provided for the protocol component described above with respect to FIG. 1. Before proceeding, it is noted that the protocols described herein can be provided in an open-ended or closed loop manner. In an open-ended configuration, a terminal reports its capabilities to the network and the network automatically adjusts its capabilities according to the reported information and parameters. In a closed loop system, negotiations occur between the terminal and the base station or other device transmitting to the terminal. In this type of system, network parameters and performance is not adjusted until the terminal and the transmitting devices agree to an acceptable rate at which to compress and decompress data. Such negotiations are common in an Internet network for example.

In one example protocol implementation 200, adjustable network protocol can be added directly at 210 to the robust header compression (HC) protocol described herein. Thus, for terminals that utilize HC, additional parameters can be added to the HC protocols that allow terminals to specify the maximum rates at which they can process compressed data. This includes additional parameter related to decompression of data as well. At 220, the adjustable network protocol can be added to Evolved Universal Terrestrial Radio Access Network protocols (E-UTRAN). In this example, the E-UTRAN protocol would determine acceptable processing rates for the terminals while treating HC as essentially a black box. This method has the advantage of leaving the HC protocol unmodified for use in E-UTRAN. In a similar method at 230, the adjustable network protocol described above can be added to packet data convergence protocol (PDCP), where the PDCP treats the HC as essentially a black box. As can be appreciated, other protocols implementations are possible where the terminal specifies the rates at which it is capable of processing data and at least one other network device automatically adjusts its communications rate in response to the respective specification.

Figure 3:
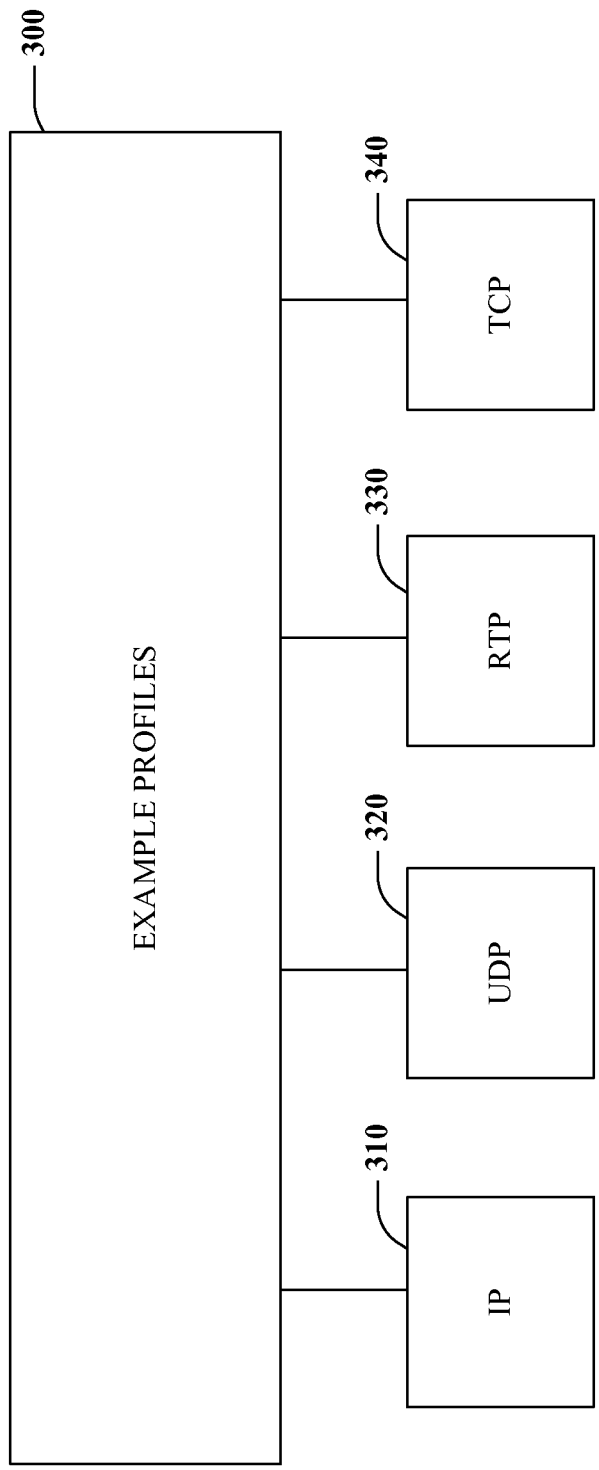
FIG. 3 is a block diagram of example network profiles that can be employed with a dynamically adjustable network protocol.

Referring to FIG. 3, example network profiles 300 are illustrated that can be employed with the dynamically adjustable protocols described herein. Header Compression is a method to compress the Internet Protocol (IP) packet headers, where various profiles are specified including an IP profile 310 which compresses the IP header, a user datagram protocol (UDP) profile 320 for a UDP/IP header, a real time transport protocol (RTP) profile 330 for RTP/UDP/IP profile, and a transmission control protocol (TCP) profile 340 for TCP/IP headers. Due to the extent of parsing, context lookup storage, read/write operations, the process of compressing and decompressing IP packet headers is computationally intensive. A given CPU may for instance be able to receive 256 Kbps of data over the air, but only process 10 Kbps of header compressed data. In a wireless system, radio resources would be improperly utilized if the rate reserved on the wireless medium exceeded the highest rate that can be processed by the CPU at the terminal or other user equipment (UE). In order to facilitate that the case above does not happen, several UE capabilities are provided to indicate: Maximum header compression rate: how fast the CPU can compress packet headers; and Maximum header de-compression rate: how fast the CPU can de-compress packet headers. Further to the above, capabilities (compression and decompression) may be specified for each header compression profile.

Figure 4:
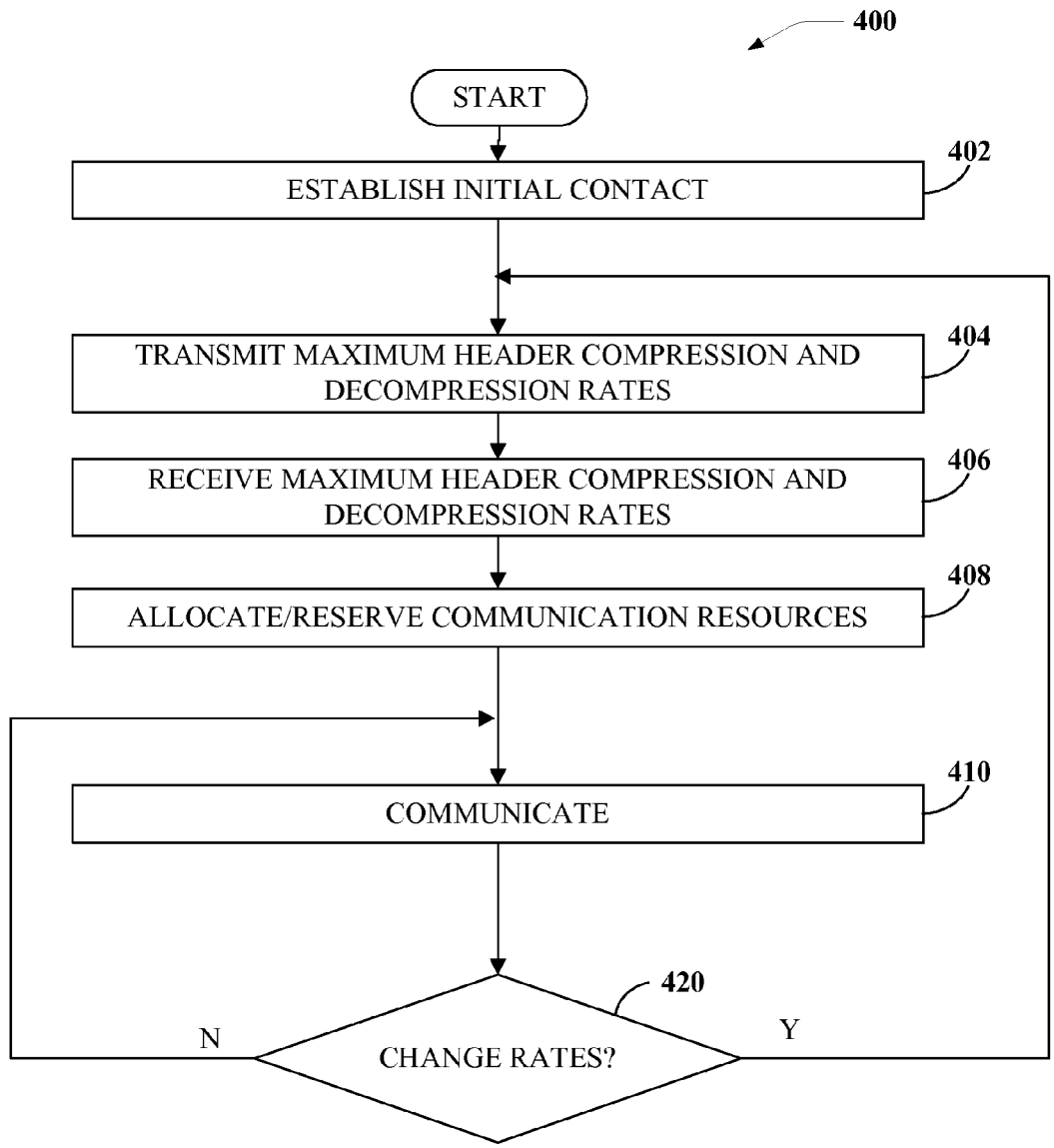
FIGS. 4-5 illustrate exemplary methods that employ dynamically adjustable compression and decompression protocols.
Figure 5:
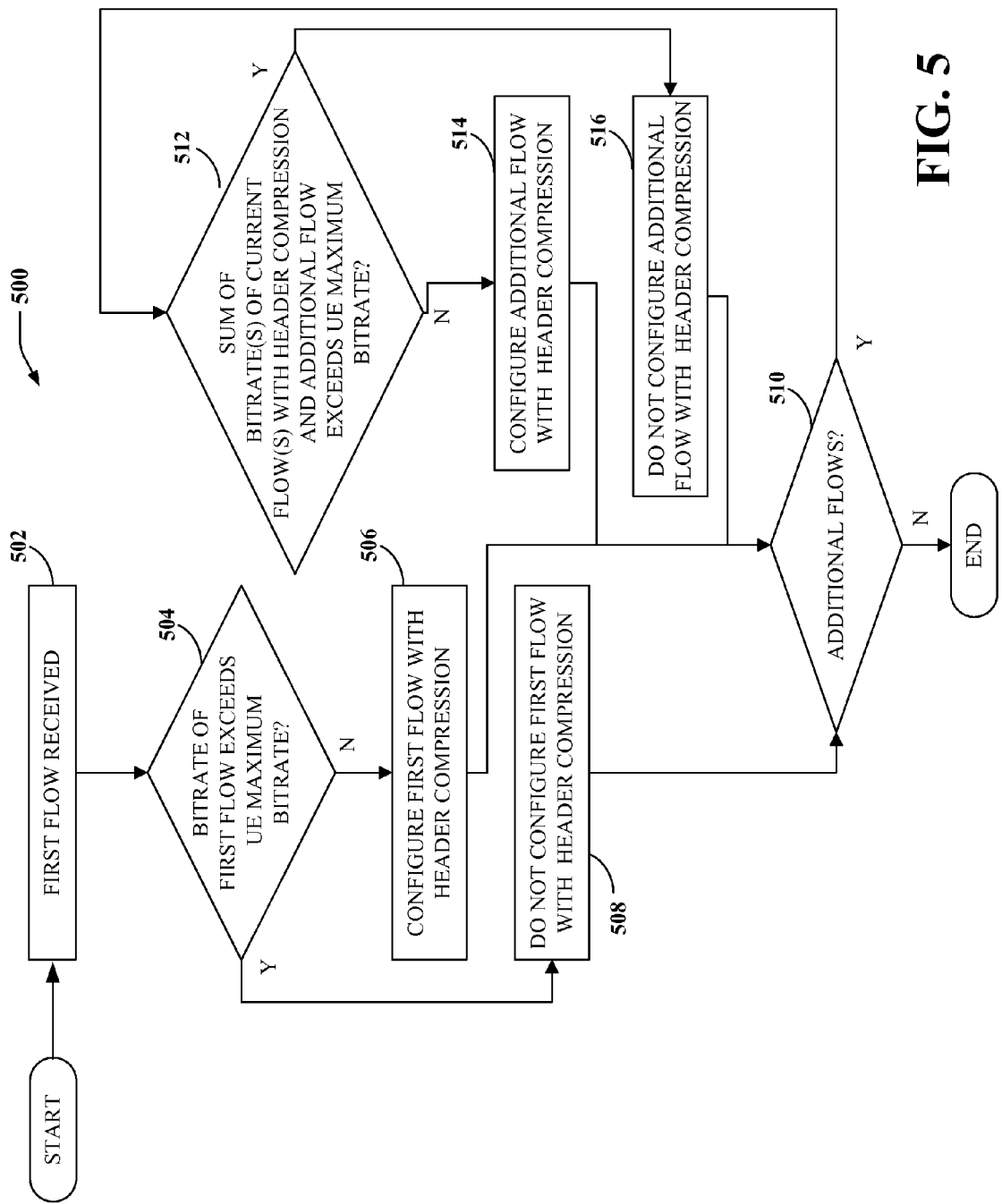

Referring now to FIGS. 4 and 5, wireless communications methodologies are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

FIG. 4 illustrates a method 400 outlining an exemplary operation of the disclosed methods and systems. The process starts at 402 where initial contact is established between a UE and a Node-B. Next, at 404, compression/decompression rate information may be passed from the UE to the Node-B. In operation, the passing of such compression/decompression information may be accomplished using an available control channel, but in various embodiments the passing of such compression/decompression data may be performed using substantially any form or data or control channel available to the UE and Node-B. It is noted that compression/decompression rates may be specified separately for any number of useable compression profiles, including profiles for IP, UDP, TCP and RTP protocols. The process continues to 406.

At 406, the compression/decompression information may be received by the Node-B, and at 408, rate resources between the UE and Node-B may be allocated/reserved, typically by the Node-B. The available rate for a link between a UE and Node-B may utilize many forms such as the number of frequency bins as well as the modulation and coding allocated in an OFDM system, but it is to be appreciated the particular manifestation of allocated resources may change from embodiment to embodiment. Next, at 410, uplink (UL) and downlink (DL) communication may commence based on default rates (or other parameter), which may be independently specified. The process continues to 420.

At step 420, a determination is made as whether to change rates. Generally, the specification of compression and decompression rates can occur at the onset of communication between a UE and Node-B, but it is to be appreciated there may be circumstances, such as the reallocation of processing resources at the UE, where the compression and decompression rates may be increased and decreased. Accordingly, it should be appreciated that a reserved rate for a communication medium linking the UE and Node-B may dynamically change. Returning to the process 400, if a data rate (UL, DL or both) is to be changed, control jumps back to 404; otherwise, control jumps back to 410.

Referring to FIG. 5, a method 500 depicts an exemplary operation for carrying out act 408 of FIG. 4 according to one embodiment. The method 500 depicts an exemplary process for allocating communication resources with HC according to one embodiment. The method 500 begins at 502, where a first flow (also referred to as a radio bearer) is set up.

At 504, the rate or the maximum rate of the first flow is compared to the UE maximum compression or decompression rate to determine whether header compression (HC) will be applied to the first flow. The maximum compression rate is used for admission of uplink flows with HC and maximum decompression rate is used for admission of downlink flows with HC. If the rate for the flow does not exceed the UE maximum compression or decompression rate, the method 500 proceeds to 506 where the first flow is configured with HC; otherwise, the method 500 proceeds to 508 and the first flow is not configured with HC. This process may be performed by considering all the flows and comparing with one maximum rate or by considering all the flows using one profile and comparing against the maximum rate for that profile.

At 510, if no additional flows are received, the method 500 concludes. Otherwise, if additional flows are received, the method 500 proceeds to 512, where the sum of the rates or the maximum rates of current flow(s) with HC is compared to the UE maximum compression or decompression rate to determine whether HC will be configured for the additional flow. The sum for uplink flows are evaluated against the UE maximum compression rate, and the sum for downlink flows are evaluated against the UE maximum decompression rate. If the sum of the rates for current flow(s) with HC and the rate for the additional flow does not exceed the UE maximum compression or decompression rate, the method 500 proceeds to 514 where the additional flow is configured with HC; otherwise, the method 500 proceeds to 516 and the additional flow is not configured with HC. At 510, if no additional flows are received, the method 500 concludes. Otherwise, the method 500 repeats at 512 as described above.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
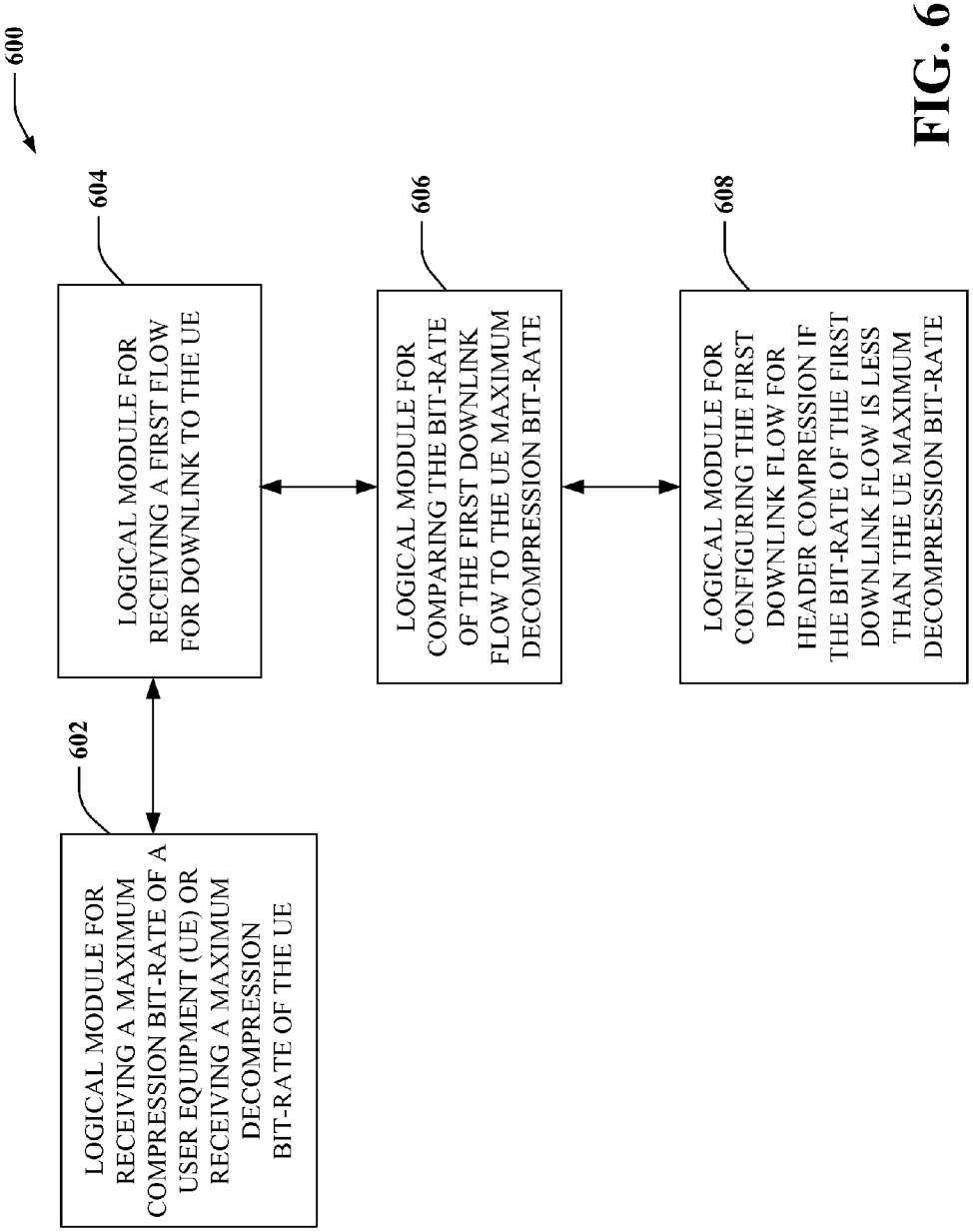
FIG. 6 illustrates an example logical module for dynamically adjustable protocols.
Figure 7:
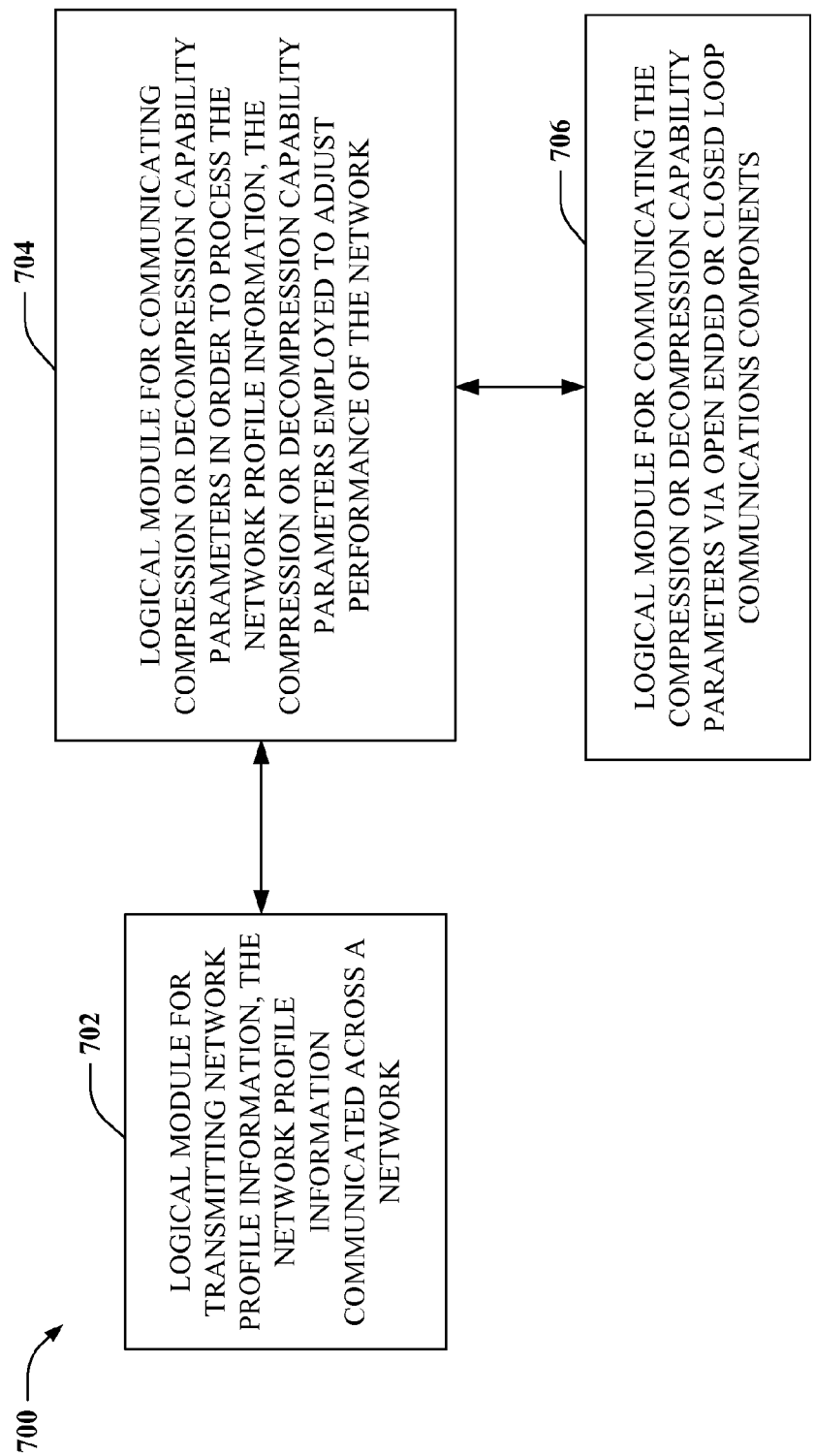
FIG. 7 illustrates an example logical module for wireless processing.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication device 600 is provided. The device includes a logical module 602 for receiving a maximum compression rate of a user equipment (UE) or receiving a maximum decompression rate of the UE. This include a logical module 604 for receiving a first flow for downlink to the UE and a logical module 606 for comparing the rate of the first downlink flow to the UE maximum decompression rate. The device also includes a logical module 608 for configuring the first downlink flow for header compression if the rate of the first downlink flow is less than the UE maximum decompression rate.

Referring to FIG. 7, a wireless communication system 700 is provided. The system includes a logical module 702 for transmitting network profile information, the network profile information communicated across a network. This includes a logical module 704 for communicating compression or decompression capability parameters in order to process the network profile information, where the compression or decompression capability parameters are employed to adjust performance of the network. The system 700 also includes a logical module 706 for communicating the compression or decompression capability parameters via open ended or closed loop communications components.

Figure 8:
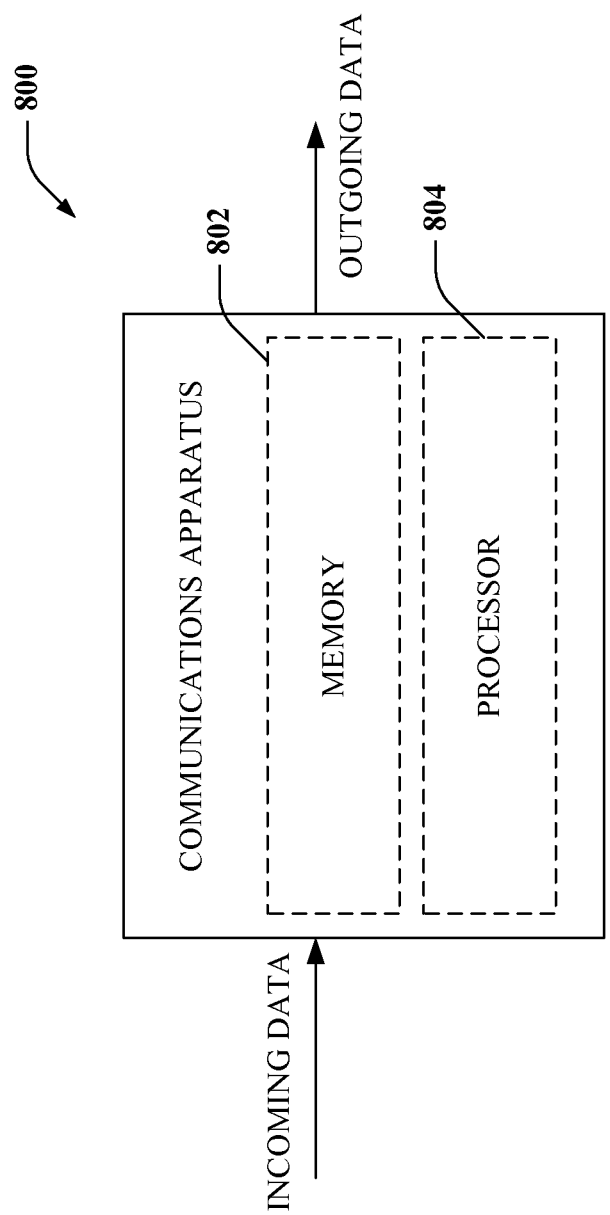
FIG. 8 illustrates an example communications apparatus that employs adjustable compression and decompression protocols.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
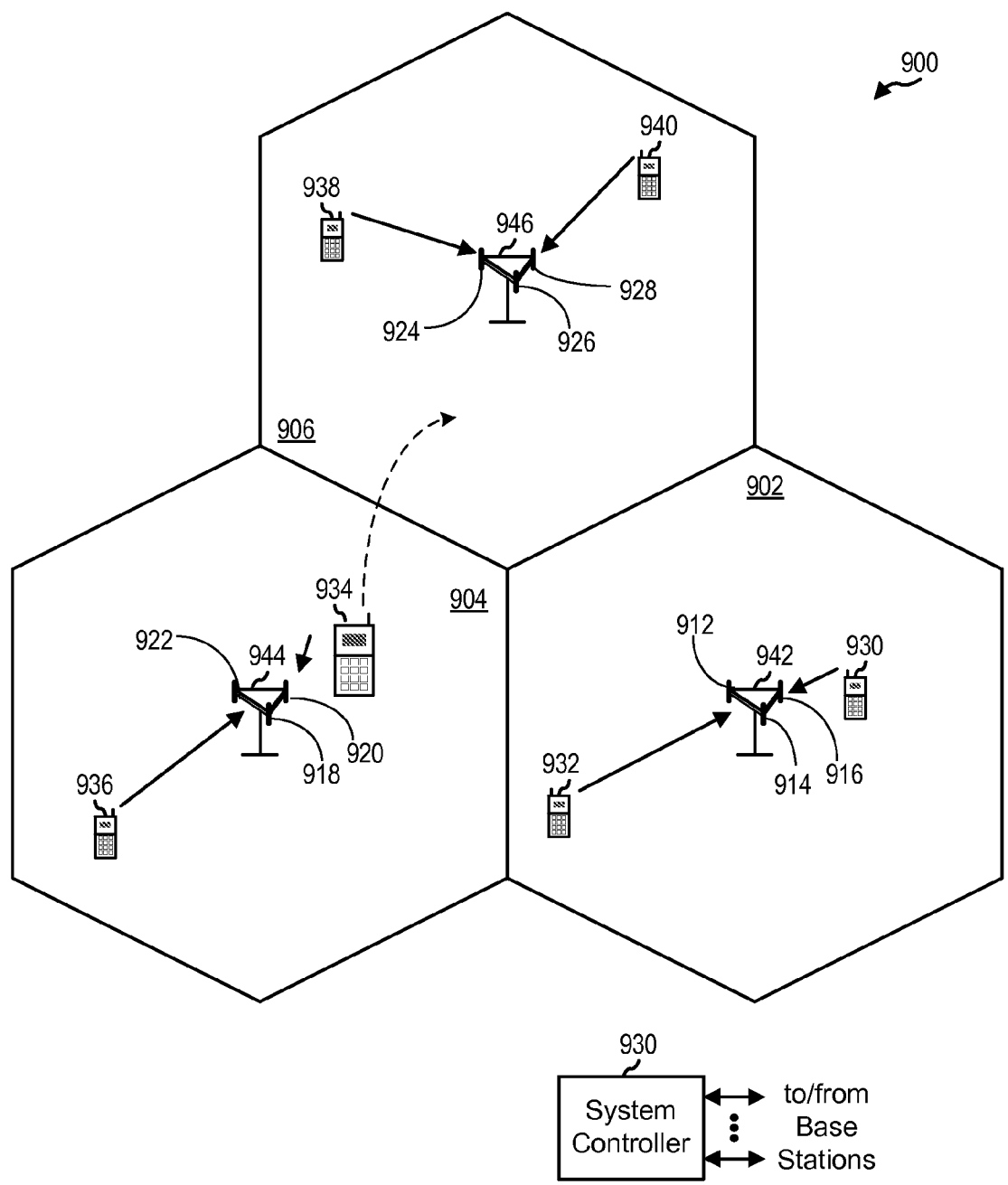
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Robust Header Compression (RoHC) (as defined in the RFC 4995 and 3095) is a standardized method to compress the headers of packets. This compression scheme differs from other compression schemes such as IETF RFC 1144 and RFC 2508, by the fact that it performs well over links where the packet loss rate is high, such as wireless links. In streaming applications, the overhead of IP, UDP, and RTP is 40 bytes for Ipv4 or 60 bytes for Ipv6. For Voice over Internet Protocol (VoIP), this corresponds to about 60% of the total amount of data sent. Such large overheads may be tolerable in wired links where capacity is often not an issue, but are excessive for wireless systems where bandwidth is scarce.

Typically, RoHC compresses packet headers, not packet payloads. Often, the RTP compression protocol can compress IP/UDP/RTP headers of voice and video RTP traffic from 40 bytes down to 3-5 bytes. Note that word "robust" in context means that ROHC compression is not less robust than the corresponding uncompressed traffic. Also, the word robust in RoHC does not mean that ROHC traffic is more robust than uncompressed traffic. The word "robust" distinguishes RoHC from other header compression protocols which are not robust for links with moderate to high error rates.

The RoHC protocol is typically implemented by placing a compressor before a link that has limited capacity and a de-compressor after that link. The compressor converts the large overhead to only a few bytes, while the de-compressor performs the opposite. Unfortunately, due to the extent of parsing, context lookup storage and read/write operations, the process of compressing and decompressing IP packet headers may be computationally intensive. For example, a given CPU may for instance be able to receive 256 Kbps of data over the air, but only process 10 Kbps of header compressed data. The RoHC protocol is described in RFC 3095, where the RoHC family of header compression protocols is intended for wireless links which have moderate to high error rates and/or packet loss rates. Prime applications of RoHC may include 3G and other wireless mobile telephony standards that facilitate the efficient integration of voice (and other real-time traffic) with data.

In a wireless system, radio resources may be wasted if the rate reserved on a wireless medium exceeded the highest rate that can be processed by the CPU. In order to facilitate that the case above does not happen, the disclosed methods and systems can add several new UE capabilities to indicate: (1) Maximum header compression rate, e.g., how fast the CPU can compress IP headers, and (2) Maximum header de-compression rate, e.g., how fast the CPU can de-compress IP headers. These header decompression and decompression rate capabilities may be expressed in various terms, such as in terms of bits per second, headers per second, or numbers of bytes of header per second, for example. Furthermore, header compression and decompression rate capabilities may be specified for each HC profile. For instance, the maximum header compression rate may be specified separately for IP, UDP, TCP and RTP profiles. These capabilities may be received by the Node-B for scheduling and configuration of communication resources as described herein.

Figure 10:
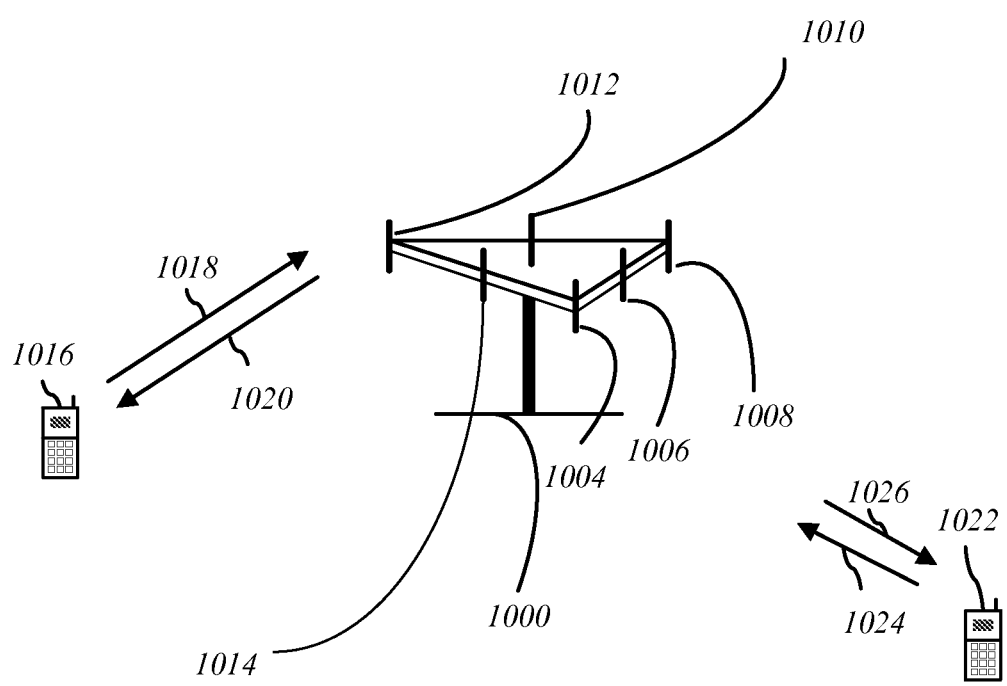
FIGS. 10 and 11 illustrate example communications systems that can be employed with dynamically adjustable network parameters.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
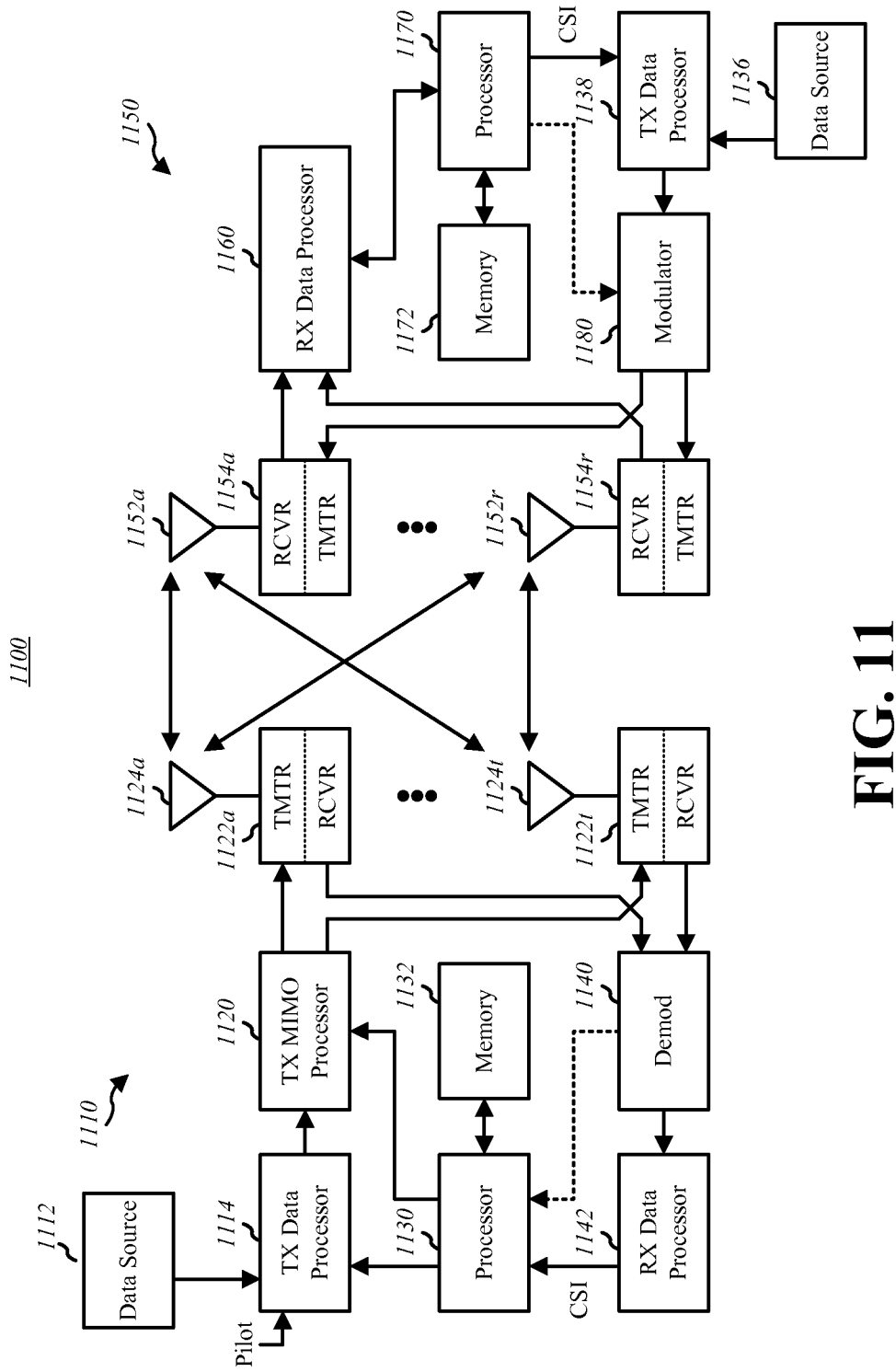

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for communicating in a wireless system, comprising:
   receiving, at a first device, network performance parameters of a second device, the network performance parameters include at least one of a maximum compression rate of the second device or a maximum decompression rate of the second device;
   reserving a rate of a medium communicatively linking the first device and the second device based on the at least one of the maximum compression rate or the maximum decompression rate of the second device; and
   communicating between the first device and the second device based on the reserved rate of the medium.

2. The method of claim 1, wherein the maximum compression rate includes a maximum header compression rate, and wherein the maximum decompression rate includes a maximum header decompression rate.

3. The method of claim 2, further including receiving at least one of the maximum header compression rate or the maximum header decompression rate for a plurality of profiles.

4. The method of claim 3, wherein the profiles include an Internet Protocol (IP) profile, user datagram protocol (UDP) profile, transport control protocol (TCP) profile, or real time transport protocol (RTP) profile.

5. The method of claim 2, wherein the maximum header compression rate or maximum header decompression rate is expressed in unit of number of headers per second, in unit number of bits of headers per second, or in units of bits per second.

6. The method of claim 1, wherein the first device is a base station and the second device is a user terminal.

7. The method of claim 1, wherein the reserved rate of the medium is determined prior to transmission of application data to the first device.

8. An apparatus for wireless communications, comprising:
   means for receiving, at a first device, network performance parameters of a second device, the network performance parameters include at least one of a maximum compression rate of the second device or a maximum decompression rate of the second device;
   means for reserving a rate of a medium communicatively linking the first device and a second device based on the at least one of the maximum compression rate or the maximum decompression rate; and
   means for communicating between the first device and the second device based on the reserved rate of the medium.

9. The apparatus of claim 8, wherein the maximum compression rate includes a maximum header compression rate, and wherein the maximum decompression rate includes a maximum header decompression rate.

10. The apparatus of claim 9, further including means for receiving at least one of the maximum header compression rate or the maximum header decompression rate for a plurality of profiles.

11. The apparatus of claim 9, wherein the maximum header compression rate or maximum header decompression rate is expressed in unit of number of headers per second, in unit number of bits of headers per second, or in units of bits per second.

12. A wireless communications device, comprising:
   a memory; and
   a processor coupled to the memory and configured to receive network performance parameters of a second device, the network performance parameters include at least one of a maximum compression rate of the second device or a maximum decompression rate of the second device, to reserve a rate of a medium communicatively linking the wireless communication device and the second device based on the at least one of the maximum compression rate or the maximum decompression rate and to communicate between the wireless communication device and the second device based on the reserved rate of the medium.

13. The wireless communications device of claim 12, wherein the maximum compression rate includes a maximum header compression rate, and wherein the maximum decompression rate includes a maximum header decompression rate.

14. The wireless communications device of claim 13, wherein the processor is further configured to receive at least one of the maximum header compression rate or the maximum header decompression rate for a plurality of profiles.

15. The wireless communications device of claim 14, wherein the profiles include an Internet Protocol (IP) profile, user datagram protocol (UDP) profile, transport control protocol (TCP) profile, or real time transport protocol (RTP) profile.

16. The wireless communications device of claim 13, wherein the maximum header compression rate or maximum header decompression rate is expressed in unit of number of headers per second, in unit number of bits of headers per second, or in units of bits per second.

17. A computer program product for communicating in a wireless communication system, the computer program product comprising a computer-readable storage medium that includes:
   code for receiving, at a first device, network performance parameters of a second device, the network performance parameters include at least one of a maximum compression rate of the second device or a maximum decompression rate of the second device;
   code for reserving a rate of a medium communicatively linking the first device and a second device based on the at least one of the maximum compression rate or the maximum decompression rate; and
   code for communicating between the first device and the second device based on the reserved rate of the medium.

18. The computer program product of claim 17, wherein the maximum compression rate includes a maximum header compression rate, and wherein the maximum decompression rate includes a maximum header decompression rate.

19. The computer program product of claim 18, wherein the computer-readable storage medium further includes code for receiving at least one of the maximum header compression rate or the maximum header decompression rate for a plurality of profiles.

20. The computer program product of claim 18, wherein the maximum header compression rate or maximum header decompression rate is expressed in unit of number of headers per second, in unit number of bits of headers per second, or in units of bits per second.

* * * * *